Dec. 6, 1949     A. E. WILDE, JR     2,490,329
SUPPRESSION OF RADIO FREQUENCY NOISE VOLTAGES
Filed Feb. 1, 1944     2 Sheets-Sheet 1
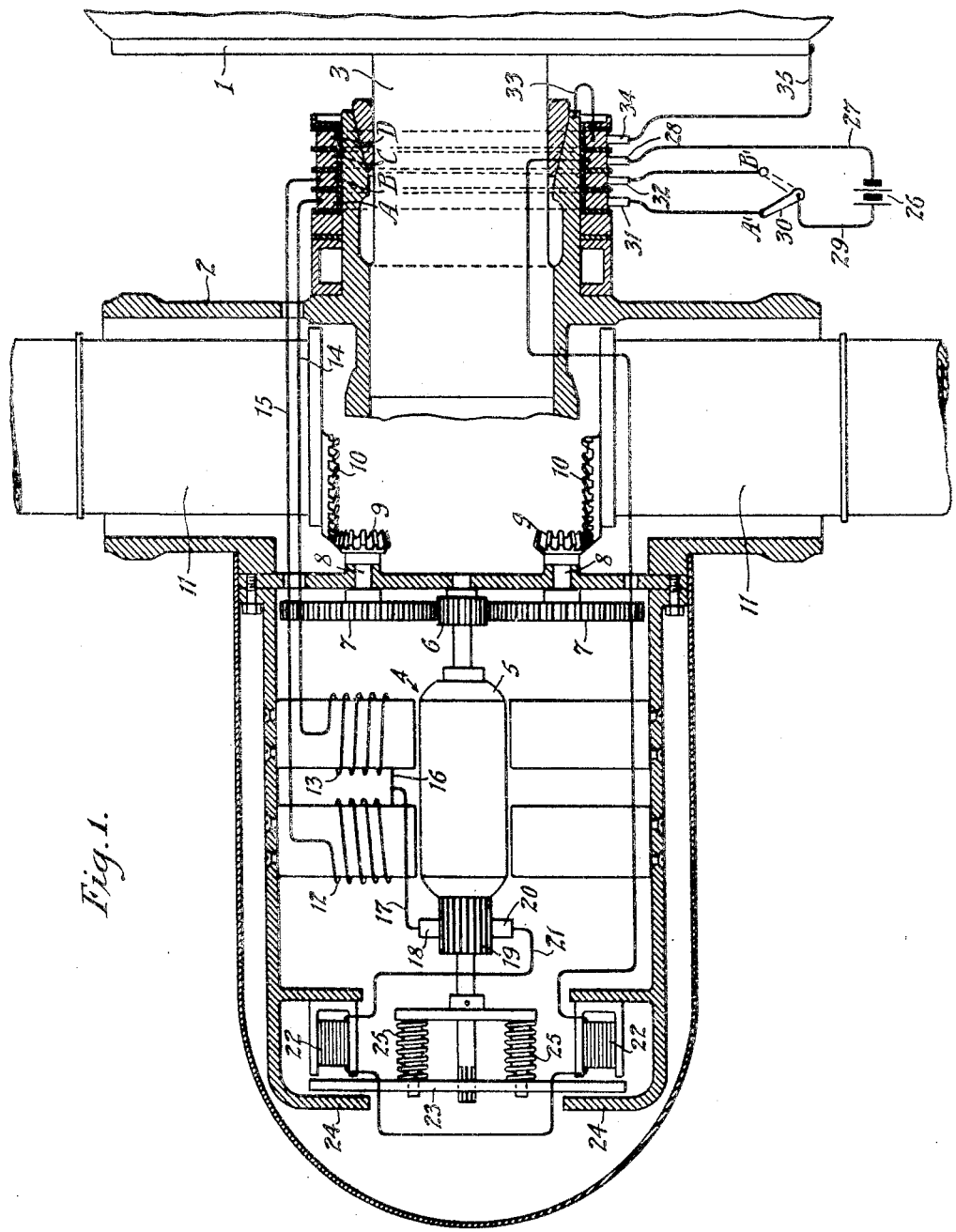
Fig. 1.
INVENTOR
Arthur E. Wilde Jr.
BY 
ATTORNEY

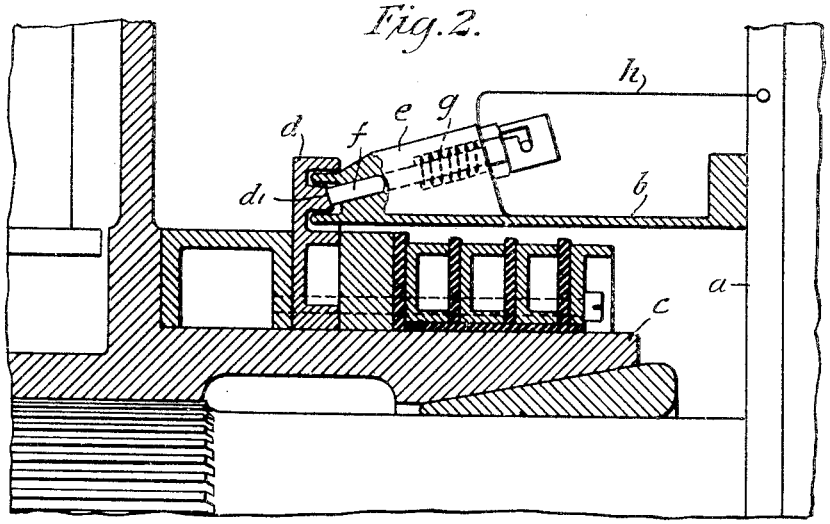
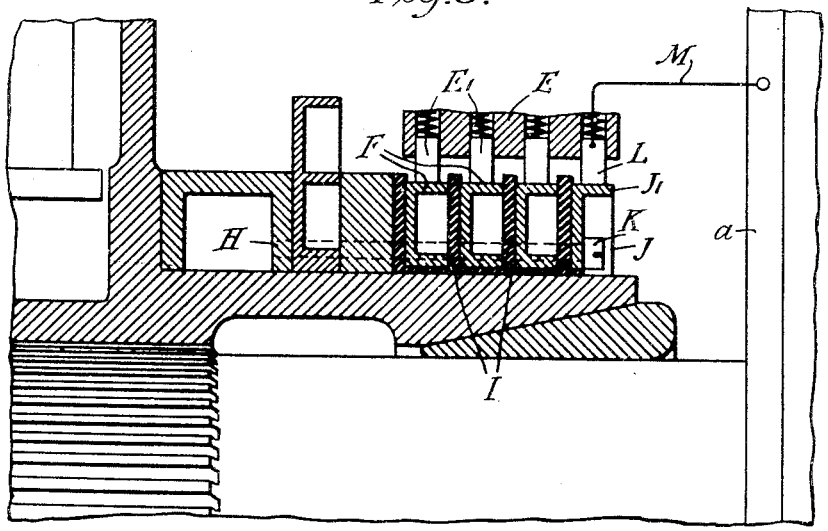

Patented Dec. 6, 1949

2,490,329

UNITED STATES PATENT OFFICE 2,490,329

SUPPRESSION OF RADIO-FREQUENCY NOISE VOLTAGES

Arthur E. Wilde, Jr., West Caldwell, N. J., assignor to Curtiss-Wright Corporation, a corporation of Delaware Application February 1, 1944, Serial No. 520,715

1 Claim. (Cl. 170—160.23)

My invention relates to an arrangement or means for the suppression of radio-frequency noise voltages.

More specifically, my invention relates to an arrangement or means for suppressing radio-frequency noise voltages generated by sparking or unstable electrical contacts between brushes and a commutator or between slip rings and their respective brushes.

More particularly, my invention has reference to the suppression of radio-frequency noise voltages generated in the pitch-changing circuits or equipment of an airplane propeller and transmitted therefrom to the rotatable propeller, creating radio-frequency waves which are picked up by the airplane radio antenna, causing radio-frequency interference, or static during operation of the pitch-changing motor.

Various other objects, advantages and features of my invention will become apparent from the following detailed description.

During the description, reference will be had to the accompanying drawings, in which:

Figure 1 is a diagrammatic representation of an electric propeller embodying my noise suppression device;

Fig. 2 is a sectional view showing a modified form of my invention; and

Fig. 3 is a sectional view showing another form of my invention.

Referring to Fig. 1, I have shown the nose 1 of a suitable aircraft engine having the hub 2 of an airplane propeller journalled thereto by a suitable shaft 3, said hub 2 having a cylindrical section extending forwardly thereof which is adapted to receive the pitch-changing motor and associated parts. Integral with the hub 2 are four slip rings A, B, C and D, the slip ring D being utilized in a novel manner, as described later.

Disposed within the hub 2 is a motor 4 comprising an armature 5 which carries a gear wheel 6 meshing with the gear wheels 7, 7 which are connected by suitably journalled shafts 8, 8 to the gear wheels 9, 9 respectively, which, in turn, mesh with the respective gear wheels 10, 10, of the propeller blades 11, 11. It will be recognized that Fig. 1 is merely a diagrammatic representation of a well-known propeller pitch-changing arrangement.

Forming a part of the motor 4 is the field coil 12 and the oppositely-wound field coil 13, the upper terminals of which are connected by conductors 14 and 15 to slip rings A and B, respectively. When separately energized, the field coils 12 and 13 are adapted to establish magnetic fields of opposite polarity relative to the armature windings, not shown, of the motor 4, these magnetic fields being adapted, as understood in the art, for operation of the motor in increased pitch direction and decreased pitch direction, respectively. The lower terminals of the field coils 12 and 13 are connected together by conductor 16 from which branches conductor 17 extending to brush 18 which is coactable with the commutator 19 of the motor 4. Diametrically opposite the brush 18 and coactable with the commutator 19 is a brush 20 from which extends conductor 21 passing through an electromagnet 22 to slip ring C. When energized, the electromagnet 22 is adapted to release the brake disc 23 of the armature 5 from its normal position in contact with a hub-section 24 in which position it is normally held by the compression springs 25.

Outside the hub 2 is a battery 26, one terminal of which is connected by conductor 27 to brush 28 which is coactable with slip ring C. The other terminal of the battery 26 is individually contactable through conductor 29 and switch 30 with brush 31 or brush 32, which, in turn, are coactable with slip ring A and slip ring B, respectively.

With the switch in position A', a circuit is closed including the battery 26, brush 31, slip ring A, field coil 13, brush 18, commutator 19 and related armature windings, not shown, brush 20, electromagnet 22, slip ring C and brush 28, to cause pitch increasing operation of the motor 4.

With the switch in position B', a circuit is closed including the battery 26, brush 32, slip ring B, field coil 12, brush 18, commutator 19 and related armature windings, not shown, brush 20, electromagnet 22, slip ring C and brush 28, to cause pitch decreasing operation of the motor 4.

As is evident from the circuit diagram of Fig. 1, during operation of the pitch-changing motor as described above, no direct current flows from the rotatable propeller structure through the propeller-engine shaft 3 to the airplane frame, which flow of direct current, if permitted, would generate radio-frequency noise voltages, due to the unstable electrical contact and possible sparking between said propeller shaft 3 and the engine. These radio-frequency noise voltages, if present on the rotatable propeller structure, would create radio-frequency waves which would be picked up by the airplane radio antenna and cause radio-frequency interference or static during operation of the pitch-changing motor.

However, operation of the motor 4 in either direction causes current to flow through two of the slip rings A, B and C and two of the brushes 28, 31 and 32 coactable therewith, and through the commutator 19 and the brushes 18 and 20 of the motor. The sparking and the inherently unsteady electrical contact between the brushes 28, 31 and 32 and slip rings A, B and C respectively and between the commutator 19 and brushes 18 and 20 associated therewith establish radio-frequency noise voltages in the pitch-changing circuits which are transmitted to the rotatable propeller structure by virtue of the capacitance existing between said propeller structure and said pitch-changing circuits. These noise voltages create radio-frequency waves which are picked up by the airplane radio antenna, causing radio-frequency interference or static during operation of the pitch-changing motor.

If the motor circuit is grounded directly to the propeller, the noise voltages at radio frequencies are even greater, whether the grounding of the propeller and motor circuits are accomplished by a slip ring connection or by conductance through the propeller shaft-engine bearings.

I eliminate this undesirable effect by providing a low impedance ground path between the rotating propeller structure and the airplane frame independent of the power circuits to the propeller, which minimizes potential difference between the airplane and propeller and thus minimizes interference picked up by radio apparatus carried on the airplane. The rotatable propeller structure is grounded or substantially so, eliminating or greatly attenuating the aforesaid radio-frequency noise voltages existing upon said rotatable propeller structure.

To accomplish the desired grounding, as shown in Fig. 1, the rotating propeller structure is connected to the additional slip ring D by conductor 33. Coactable with the slip ring D is a brush 34 which communicates through conductor 35 with the airplane frame. It will be understood that no sparking occurs between the brush 34 and slip ring D because only radio-frequency current of very small magnitude passes therethrough, this circuit serving merely to ground radio-frequency voltages impressed on the rotating propeller structure.

An alternative method of grounding the airplane frame to the rotating propeller structure is shown in Fig. 2, in which the airplane frame $a$ has secured thereto the brush housing $b$ within which is disposed a brush rigging coactable with conventional slip rings, not shown. Journalled to the frame $a$ is a hub section $c$ having the seal ring $d$ secured thereto and rotatable therewith, said seal ring $d$ having a circular conducting surface $d1$ which communicates electrically with the rotatable propeller structure.

Suitably secured to an exterior surface of the brush housing $b$ is a boss $e$ which carries a brush $f$ one end of which is held in engagement with the conducting surface $d1$ of the sealing ring $d$ by a spring $g$, the other end contacting the airplane frame $a$ through conductor $h$.

An electrical path is thereby formed from the rotating propeller structure, through the hub section $c$, seal ring $d$, conductor ring $d1$, brush $f$, boss $e$, brush housing $b$, to the airplane frame $a$, this path serving, as explained before, to ground the rotatable propeller structure independent of the insulated propeller power circuits. It will be understood that the brush, just described, is similar to the brush used with the arrangement shown in Fig. 1, the brush $f$ and conducting ring $d1$ replacing the brush 34 and slip ring D of Fig. 1, respectively.

A third method of grounding the rotating propeller structure to the engine or airplane frame is illustrated in Fig. 3, in which the engine or airplane frame supports a brush housing E, which carries any suitable number of brushes E1 coactable with the slip rings F, respectively, said slip rings F being supported on a frame H associated with the propeller hub. The slip rings F are electrically insulated from each other and from the hub and frame H by bushings I, the outermost of which is engaged by a lock ring J secured to the frame H by bolts K. A circumferential flange J1 of the lock ring J is coactable with a brush L which is connected electrically to the engine frame, as by conductor M.

An electrical path is thus formed from the rotating propeller structure through the frame H, screws K, lock ring J, flange J1, brush L, conductor M to the airplane frame, this path being utilized, as described before to ground the rotatable propeller structure.

By grounding the rotatable propeller structure to the airplane frame, for example, by any of the methods previously described, together with electrically isolating the pitch-changing circuits from the rotating propeller structure, the radiation of radio-frequency noise voltages from said rotating propeller structure is eliminated or minimized.

It will be understood that the radio-frequency noise voltages referred to in the specification include all types of radio-frequency energy or power which may be converted into radio-frequency waves and cause interference with the airplane radio apparatus.

While the invention has been described with respect to certain particular preferred examples which give satisfactory results, it will be understood by those skilled in the art after understanding the invention, that various changes and modifications may be made without departing from the spirit and scope of the invention, and it is intended therefore in the appended claim to cover all such changes and modifications.

What is claimed as new and desired to be secured by Letters Patent, is:

In an electrically actuated controllable pitch propeller including a metallic hub structure having an integral inboard cylindrical extension and a plurality of electrical components in insulated relation thereto, a stack of insulating rings and alternate metallic slip rings sleeved over said extension, all of said metallic rings being insulated from said sleeve and being connected independently of and only to said electrical components of the propeller other than the propeller hub structure, the end rings of said stack comprising insulating rings, one bearing on its face against a portion of said hub, an additional metallic ring beyond and engaging the other end insulating ring, metallic means engaging said additional ring and passing through the other said rings and engaging a portion of said hub to secure the entire ring stack thereto, said metallic means being in insulated relation to all metallic rings except said additional metallic ring, a metallic non-rotating supporting structure and a plurality of brushes mounted on said structure in insulated relation thereto, engaging the several rings, that brush engaging said additional metallic ring being electrically bonded to said structure.

ARTHUR E. WILDE, Jr.

REFERENCES CITED

The following references are of record in the file of this patent:

UNITED STATES PATENTS

| Number | Name | Date |
|---|---|---|
| 1,693,072 | De Forest | Nov. 27, 1928 |
| 1,793,652 | Turnbull | Feb. 24, 1931 |
| 1,793,653 | Turnbull | Feb. 24, 1931 |
| 1,951,320 | Blanchard | Mar. 13, 1934 |
| 1,994,905 | Bowles | Mar. 19, 1935 |
| 2,035,732 | Vining | Mar. 31, 1936 |
| 2,108,530 | Ellis et al. | Feb. 15, 1938 |
| 2,128,983 | Blanchard | Sept. 6, 1938 |
| 2,192,321 | Meier | Mar. 5, 1940 |
| 2,245,251 | Chilton | June 10, 1941 |
| 2,252,518 | Martin | Aug. 12, 1941 |
| 2,253,531 | Peters et al. | Aug. 26, 1941 |
| 2,256,118 | Kyropoulos | Sept. 16, 1941 |
| 2,277,905 | Eaton | Mar. 31, 1942 |
| 2,293,912 | Mullen | Aug. 25, 1942 |
| 2,346,007 | Chillson | Apr. 4, 1944 |